United States Patent
Allford

(10) Patent No.: US 7,891,671 B2
(45) Date of Patent: Feb. 22, 2011

(54) PANEL ASSEMBLY INCLUDING DEFORMABLE SEAL

(75) Inventor: Peter Allford, Bristol (GB)

(73) Assignee: Rolls-Royce plc, London (GB)

( * ) Notice: Subject to any disclaimer, the term of this patent is extended or adjusted under 35 U.S.C. 154(b) by 740 days.

(21) Appl. No.: 11/723,303

(22) Filed: Mar. 19, 2007

(65) Prior Publication Data
US 2007/0222163 A1   Sep. 27, 2007

(30) Foreign Application Priority Data
Mar. 22, 2006   (GB) ................................. 0605813.5

(51) Int. Cl.
 B64D 33/02   (2006.01)
 B64C 1/06   (2006.01)
 F16J 15/46   (2006.01)
(52) U.S. Cl. ...................... 277/645; 277/605; 277/646; 244/53 B; 244/131; 137/15.1
(58) Field of Classification Search .............. 277/630, 277/637, 605, 641, 642, 644, 645; 244/53 B, 244/131; 137/15.1
See application file for complete search history.

(56) References Cited

U.S. PATENT DOCUMENTS

| | | | | |
|---|---|---|---|---|
| 1,563,464 A | * | 12/1925 | Bisland | 215/45 |
| 2,230,303 A | * | 2/1941 | Leguillon | 404/65 |
| 2,230,688 A | * | 2/1941 | Irwin | 404/65 |
| 2,315,588 A | * | 4/1943 | Brickman | 404/67 |
| 3,182,929 A | * | 5/1965 | Lemberger | 244/12.2 |
| 3,343,324 A | * | 9/1967 | Gordon | 52/396.1 |
| 3,360,273 A | * | 12/1967 | Hundt et al. | 277/605 |
| 3,550,987 A | * | 12/1970 | Dickey | 277/605 |
| 4,361,296 A | * | 11/1982 | Hall et al. | 244/54 |
| 4,394,026 A | * | 7/1983 | Kaiser et al. | 277/642 |
| 4,470,608 A | * | 9/1984 | Warren | 277/645 |
| 4,505,308 A | * | 3/1985 | Walker et al. | 141/59 |
| 4,667,966 A | * | 5/1987 | Oehrle et al. | 277/645 |
| 4,773,618 A | * | 9/1988 | Ow | 244/23 C |
| 4,805,959 A | * | 2/1989 | Ohrle et al. | 296/216.07 |
| 4,861,043 A | * | 8/1989 | Anderson et al. | 277/312 |
| 4,930,790 A | * | 6/1990 | Sheridan | 277/630 |
| 5,094,290 A | * | 3/1992 | Buckreus | 165/83 |
| 5,135,239 A | * | 8/1992 | Kato et al. | 277/645 |
| 5,142,101 A | * | 8/1992 | Matsuzaki et al. | 174/354 |
| 5,417,442 A | * | 5/1995 | Jornhagen | 277/626 |
| 5,474,337 A | * | 12/1995 | Nepsund et al. | 285/345 |
| 5,609,313 A | * | 3/1997 | Cole et al. | 244/54 |
| 5,730,569 A | * | 3/1998 | Bucknell | 277/646 |
| 5,826,887 A | * | 10/1998 | Neumann et al. | 277/605 |
| 5,941,061 A | * | 8/1999 | Sherry et al. | 60/798 |
| 5,957,464 A | * | 9/1999 | Elliott | 277/608 |

(Continued)

Primary Examiner—Alison K Pickard
(74) Attorney, Agent, or Firm—Oliff & Berridge, PLC

(57) ABSTRACT

A panel assembly of the kind found in the air intake of a gas turbine engine or a fan duct is designed to be demountable for maintenance purposes. Consequently there exists between the panels a gap to be sealed. Thus, the assembly has a deformable seal for such a purpose and has an elongated, hollow resilient member mounted on a flange at the edge of one of the panels and arranged to be pressed against a flange at the confronting edge of the adjacent panel. The flanges are shaped such that the hollow member when pressed between the flanges effectively seals the gap between the panels and a portion of the seal member lies flush between the panel edges.

10 Claims, 1 Drawing Sheet

U.S. PATENT DOCUMENTS

| | | | |
|---|---|---|---|
| 6,003,873 A * | 12/1999 | Solberg | 277/323 |
| 6,190,219 B1 * | 2/2001 | Meier et al. | 440/77 |
| 6,361,049 B1 * | 3/2002 | Joco | 277/312 |
| 6,942,452 B2 * | 9/2005 | Bruno et al. | 415/135 |
| 6,945,539 B2 * | 9/2005 | Whitlow et al. | 277/616 |
| 7,014,145 B2 * | 3/2006 | Bagnall | 244/53 B |
| 7,086,219 B2 * | 8/2006 | Stretton et al. | 60/226.1 |
| 7,178,809 B2 * | 2/2007 | Kuzuya et al. | 277/631 |
| 7,350,619 B2 * | 4/2008 | Williams | 181/214 |
| 2004/0195783 A1 * | 10/2004 | Akagi et al. | 277/645 |
| 2004/0251378 A1 * | 12/2004 | Bagnall | 244/53 B |
| 2005/0242525 A1 * | 11/2005 | Dahlke et al. | 277/605 |
| 2007/0222163 A1 * | 9/2007 | Allford | 277/590 |
| 2009/0020647 A1 * | 1/2009 | Porte | 244/134 B |
| 2009/0297342 A1 * | 12/2009 | Laborie | 415/177 |
| 2010/0077695 A1 * | 4/2010 | Delort | 52/741.4 |

* cited by examiner

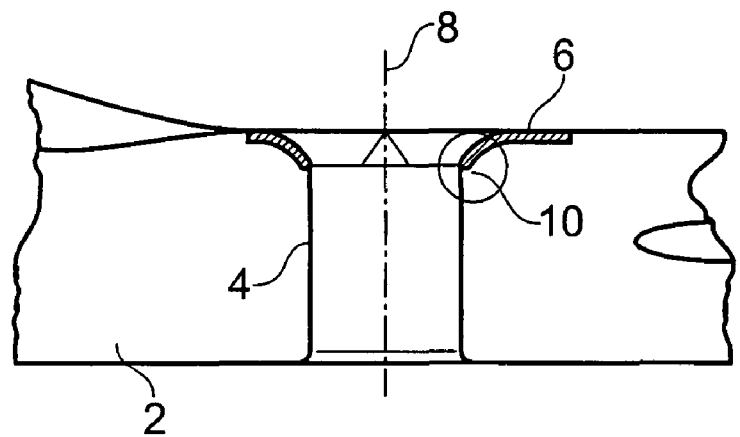
Fig. 1
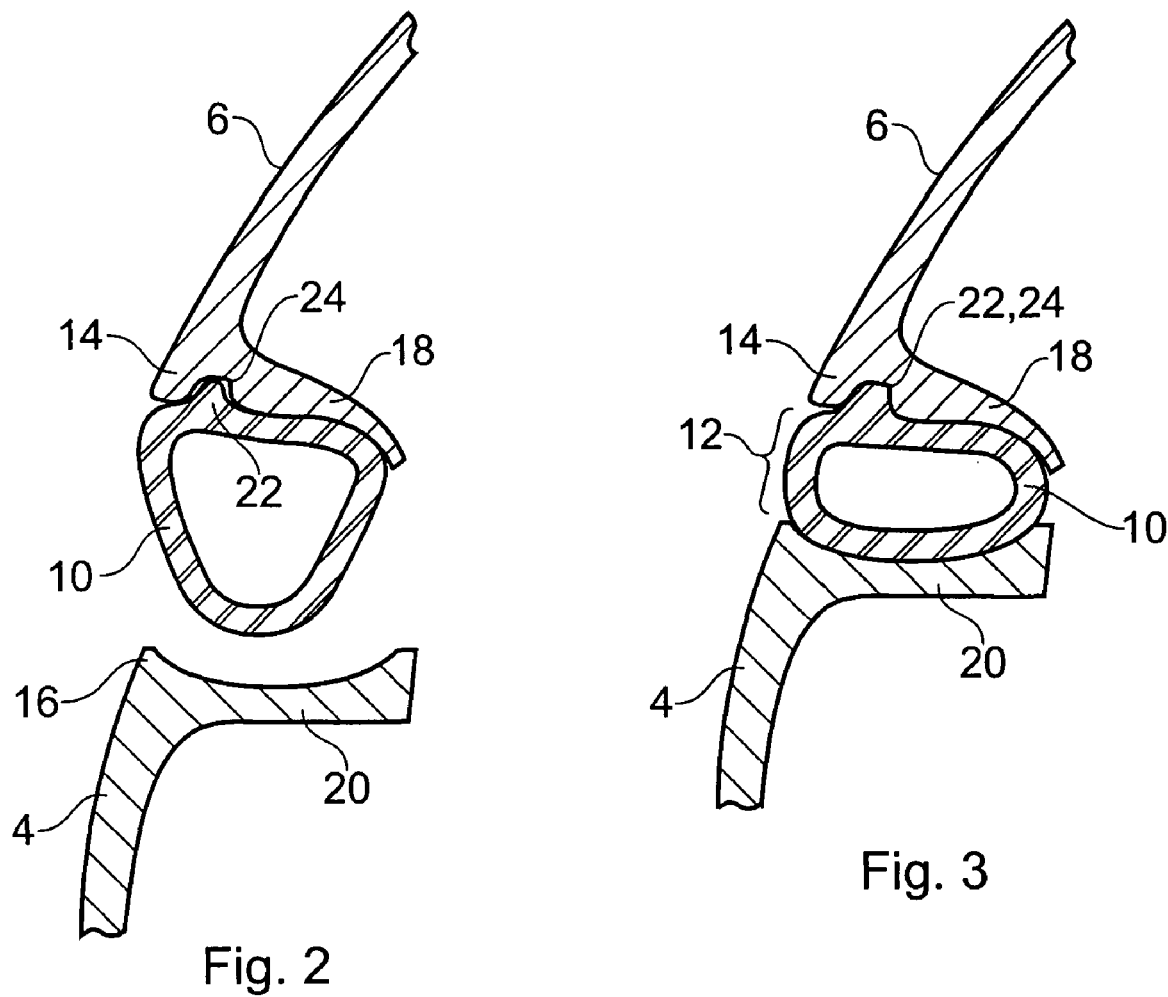
Fig. 2
Fig. 3

PANEL ASSEMBLY INCLUDING DEFORMABLE SEAL

BACKGROUND OF THE INVENTION

1. Field of the Invention

The invention related to a panel assembly including a deformable seal.

In particular the invention concerns a deformable seal for closing a gap between adjacent panel edges, which panels may be capable of limited relative movement or which may be adapted and arranged for occasional demounting, and especially where the seal is to provide a substantially level surface between panel edges.

2. Description of Related Art

The kind of known arrangement used for sealing a gap between panels in edge-to-edge relationship generally depend on the degree of permanency of the panel edges in relation one to the other. Thus, where the relationship is intended to be permanent or semi-permanent a solid gasket is used typically with rebates to receive either or both panel edges. However, where one of the panels is movable relative to the other one of them is provided with a deformable seal that, in its sealing position, is partially compressed against the other. An example of the latter type is disclosed in EP 0,096,588 in which a deformable hollow seal member is carried at the edge of a first movable panel, in the example a door to a refrigerated container space, and is compressed when the door is closed. The hollow-section sealing member has a retaining means including a portion engaged with a holding slot by means of which it is attached at one edge of the door. When compressed the seal member engages a flat face on the door frame to provide as a result of a rolling action an airtight and thermotight seal. Although this kind of seal arrangement provide an effective seal it suffers from a drawback that the seal member is not located in a position to provide a substantially level surface between the panel edges.

U.S. Pat. No. 4,546,986 discloses a gasket for joining panels in edge-to-edge relation with a level surface between the panels. However, such a gasket is intended for panels in substantially fixed, and permanent or semi-permanent relationship. On one side the gasket has a formation for engaging a slot or the like in one panel edge, and on the other side has a rebate into which is received the edge of a glass panel. The outside surface of the gasket forms a level contour with the faces of the two panels. This kind of arrangement the gasket is designed for panels in fixed relation and is not designed for the panels to be easily demounted or even replaced.

SUMMARY OF THE INVENTION

It is an object of the present invention to provide a seal member for sealing a gap between adjacent panels in edge-to-edge relationship that provides a substantially level contour across a gap between adjacent panels in edge-to-edge relation and will allow the panels to be relatively easily demounted and re-assembled with a smooth level contour.

According to one aspect of the invention there is provided a panel assembly including a first panel and a second panel mounted relative to the first panel such that there is a gap between adjacent, confronting panel edges, the assembly further comprising a deformable hollow seal member of resilient material extending the length of the gap and positioned between the confronting panel edges to close the gap, each of the confronting panel edges comprising a flange wherein the deformable seal member is mounted on one flange and arranged and adapted to engage the confronting flange which is shaped to squeeze the hollow seal member into the gap to form a substantially smooth profile across the gap between the panel edges, which profile is maintained during relative panel movements.

According to another aspect of the invention a deformable seal for use in an assembly of the kind referred to comprises an endless seal member having a lozenge-shaped cross-section. The seal member being capable of being compressed between a first flange at the edge of a first panel and a second flange at the edge of a second panel, a protruding portion in the form of a rib or tang adapted to engage a groove or slot formed in the first flange opposite the second flange.

BRIEF DESCRIPTION OF THE DRAWINGS

The invention will now be described in more detail with reference to an exemplary embodiment illustrated in the figures of the accompanying drawings, in which:

FIG. 1 is a diagrammatic illustration of an assembly in airframe installation in which the invention may be utilised;

FIG. 2 shows a cross-section view of a deformable seal of the present invention in its uncompressed state prior to installation in the assembly of FIG. 1, and FIG. 3 shows a cross-section view of the deformable seal of FIG. 3 in its installed state.

DESCRIPTION OF THE PREFERRED EMBODIMENTS

Referring firstly to FIG. 1 there is shown, in outline form as opposed to a detail view and not to scale, a partly cut-away centre section of the fuselage 2 of a vertical lift aircraft of the kind in which a large diameter fan is mounted in the fuselage for rotation about a vertical axis. The large diameter lift fan itself, although not shown, is housed within a generally cylindrical duct or module 4 mounted vertically within fuselage 2 to draw air from above the aircraft through intake 6 and exhaust it downwards towards the ground. In this context vertical, above and downwards are to be understood with reference to the normal orientation of the aircraft when on the ground. Thus, when the aircraft is stationary and resting on its undercarriage on the ground the common axis 8 of the lift fan and duct 4 lays in a substantially vertical direction.

In common with other installations, and gas turbine engines in general designed to move large volumes of air at substantial flow rates and pressure ratios, the air entry passage 6 should be efficient and possess smooth walls. That is there should be no discontinuities, steps, gaps or the like to cause energy losses in the air stream. Preferably, therefore, adjacent panels in the air passage walls should present as smooth, and continuous a surface as possible. However, for maintenance the fan module 4 is removable, and for efficiency the wall section 6 of the intake passage immediately ahead of the fan module 4 has a progressive transition shape commonly referred to as a "bell-mouth". A gasket or seal generally indicated at 10 is included to seal the gap between these two assemblies 4,6 against air leakage and flow losses and to accommodate inevitable relative movement.

Referring now to FIGS. 2 and 3, in accordance with the present invention in an assembly of this kind including first and second panels 4,6 mounted in edge to edge relationship such that there is a gap (12, FIG. 3) between adjacent panel edges 14,16. A deformable seal member 10 is positioned between the panel edges 14,16 for closing the gap 12. The seal member 10 is designed and arranged to provide a substantially level surface between the edge 14 bell mouth surface 6 and the edge 16 of the inner surface of the cylindrical fan duct 4. The edges 14,16 are defined by circles of substantially the same diameter thus providing a potentially smooth inner surface for the duct leading into the fan duct. As shown in the drawings the edge 14,16 of the fan duct 4 and bell-mouth 6 are formed with flanges 18,20 respectively. These flanges project radially outwards for a short distance and extend all around the circumference of the panel edges 14,16. Structurally the flanges 18,20 contribute to the strength and stiffness of both members. In addition the shapes of the flanges are adapted and arranged to co-operate with the seal member 10 squeezing it into filling the gap 12 and providing an exposed surface level with the airflow surfaces of the duct 4 and bell-mouth intake 6.

Following the circular symmetry of the intake 6 and duct 4, the seal member 10 is generally circular or annular with an inner diameter matching the diameter of the inner surface of the edges 14, 16 on the intake and duct. The seal member 10 is composed of an annulus of resilient material having a hollow cross-section the shape of lozenge-shape as depicted in FIG. 2 in its relaxed state. In its uncompressed state the shape of the hollow section of seal member 10 is approximately trihedral, that is the shape of the cross-section has three roughly equal length sides joined by rounded edges.

In the illustrated embodiment the seal 10 is attached to the flange 18 at the edge 14 of the bell-mouth intake 6. In this example it is located by means of a tang 22 in the manner of an upstanding rib extending along the length of the seal 10 on one of the three sides positioned just behind and parallel to one of the three corner edges. A corresponding slot 24 is formed in the flange 18 running along the length of the flange and positioned a short distance behind the edge 14. The tang 22 and slot are spaced behind the edge 14 such that the corner of the seal nearest the duct wall is substantially level with the bell-mouth surface. The tang 22 is engaged with the slot 24 to hold the seal and act as a positive locator during assembly. The seal 10 may be adhesively bonded to the flange 18 along its length to assist an assembly process.

The flanges 18,20 are generally concave to assist the squeezing and shaping of the seal member 10 during assembly and to squeeze the hollow seal member 10 into the gap 12 to form a substantially smooth profile across the gap between the panel edges 14,16. As shown in FIG. 2 the curve of flange 18 and of the side of the seal 10 that carries tang 22 conform to the same approximate, concave shape. The position of the tang 22 and slot 24 co-operate to ensure that the exposed corner edge of the seal remains aligned with the panel edge 14. The seal contacting face of the flange 20 on duct 4 is more generally elliptical in its shape. As the parts 4,6 are drawn together during assembly the freestanding corner of seal 10 is first contacted by the flange 20 and the seal progressively squeezed into an elliptical shape. The "rolling action" of seal 10 inherent in this squeezing movement and the pinching effect of the concave flanges has the effect of urging the seal into the gap 12 between the edges 14, 16. The relative dimensions of the flanges 14,16 and the seal 10 can be carefully selected to ensure that seal 10 is squeezed by an amount sufficient to provide a seal surface in the gap 12 level with the radially inner surfaces of the duct 4 and bell-mouth 6.

During relative movement of the panels 4,6 the seal 10 continues to provide a substantially smooth profile across the gap 12 between the edges 14,16. In general the relative movement of the panels 4,6 has a longitudinal component, where the panels move towards and away from each other, and a lateral component, where the panels move sideways. In the particular embodiment illustrated, in which panel 4 comprises a cylindrical duct and panel 6 comprises a bell-mouth entry, the lateral component consists of relative radial movement. The invention is particularly capable of maintaining a substantially smooth profile in the inter-panel gap during radial movements due to a rolling action in the flexing of seal 10. Movement in a perpendicular direction is accommodated by further expansive, compressive flexing of seal 10.

Other methods of positively locating the seal 10 with respect to its supporting flange may be used. For example the tang 22 and receiving slot 24 may be of more complex shapes, such as a dovetail or T-shaped, to provide more positive location. The seal member 10 may be secured in position on its supporting flange 18 by a line of suitable adhesive or as mentioned above it may be bonded to the flange. The shape of flange 18 on which the seal 10 is mounted does not need to be as concave as the shape of the confronting flange 20.

The invention claimed is:

1. A panel assembly including a first panel and a second panel mounted relative to the first panel such that there is a gap between adjacent, confronting panel edges, the assembly further comprising a deformable hollow seal member of resilient material extending the length of the gap and positioned between the confronting panel edges to close the gap, each of the confronting panel edges comprising a flange wherein the deformable seal member is mounted on one flange and arranged and adapted to engage the confronting flange which is shaped to squeeze the hollow seal member into the gap to form a substantially smooth profile across the gap between the panel edges, which profile is maintained during lateral panel movements, wherein the panels co-operate to form a circular or cylindrical duct, the first panel forms an air intake and is shaped to form a bell mouth entry to the duct, and the second panel forms an intake duct of a gas turbine engine.

2. A panel assembly including a first panel and a second panel mounted relative to the first panel such that there is a gap between adjacent, confronting panel edges, the first and second panels co-operate to form a circular or cylindrical duct, the first panel is shaped to form a bell mouthed entry to the duct, the first panel forms an air intake and the second panel forms a duct and a fan is mounted for rotation about an axis within the duct, the assembly further comprising a deformable hollow seal member of resilient material extending the length of the gap and positioned between the confronting panel edges to close the gap, each of the confronting panel edges comprising a flange wherein the deformable hollow seal member is mounted on one flange and arranged and adapted to engage the confronting flange which is shaped to squeeze the deformable hollow seal member into the gap to form a substantially smooth profile across the gap between the panel edges, which profile is maintained during lateral panel movements.

3. An assembly as claimed in claim 2 wherein the deformable seal member is mounted on the one flange by means of a rib or tang running along the length of the member engaged with a groove or slot formed in the flange.

4. An assembly as claimed in claim 2 wherein the confronting panel edges are concave and shaped to form a generally elliptical space within which the hollow member is squeezed.

5. An assembly as claimed in claim 2 wherein the deformable seal member comprises an endless seal member having a cross section that has three roughly equal length sides joined by rounded edges.

6. An assembly as claimed in claim 2 wherein the first and second panels are capable of limited relative movement.

7. An assembly as claimed in claim 2, wherein the air intake and the duct are mounted in a fuselage of a vertical lift aircraft and the fan is mounted for rotation about a vertical axis within the duct.

8. An assembly as claimed in claim 2, wherein the flanges project radially outwards and extend all around the circumference of the panel edges.

9. An assembly as claimed in claim 2, wherein the deformable hollow seal member has an uncompressed state and a compressed state, the deformable hollow seal member has an approximately triangular cross section in its uncompressed state and an elliptical cross section in its compressed state.

10. An assembly as claimed in claim 2, wherein the edges are defined by circles of substantially the same diameter.

\* \* \* \* \*